(12) United States Patent
Liou et al.

(10) Patent No.: US 7,421,813 B2
(45) Date of Patent: Sep. 9, 2008

(54) DISPLAY DEVICE HAVING AN ADJUSTABLE COUNTERWEIGHT STRUCTURE

(75) Inventors: Guan-De Liou, Taipei (TW); Chia-Pine Huang, Keelung (TW); Li-Li Lai, Banciao (TW); Stephen Tsai, Sijhih (TW)

(73) Assignee: Hannspree, Inc., Taipei (TW)

( * ) Notice: Subject to any disclaimer, the term of this patent is extended or adjusted under 35 U.S.C. 154(b) by 0 days.

(21) Appl. No.: 11/987,587

(22) Filed: Dec. 3, 2007

(65) Prior Publication Data

US 2008/0094791 A1    Apr. 24, 2008

Related U.S. Application Data

(62) Division of application No. 11/319,544, filed on Dec. 29, 2005.

(30) Foreign Application Priority Data

Nov. 23, 2005    (TW) .............................. 94141119 A

(51) Int. Cl.
*A47G 1/16*    (2006.01)

(52) U.S. Cl. ..................... 40/745; 40/747; 361/681; 248/454; 248/474; 248/923

(58) Field of Classification Search .................. 40/700, 40/725, 745, 747; 361/681; 248/441.1, 454, 248/474, 917, 919, 922, 923
See application file for complete search history.

(56) References Cited

U.S. PATENT DOCUMENTS

| | | | | |
|---|---|---|---|---|
| 3,129,524 A | * | 4/1964 | Hayslett | 40/750 |
| 4,372,515 A | * | 2/1983 | Noonan | 248/176.3 |
| 6,163,451 A | * | 12/2000 | Chiu | 361/681 |
| 6,227,518 B1 | * | 5/2001 | Sun | 248/371 |
| 6,766,994 B2 | * | 7/2004 | Serbinski et al. | 248/371 |
| 2002/0135974 A1 | * | 9/2002 | Bell et al. | 361/681 |
| 2004/0245420 A1 | * | 12/2004 | Pfister et al. | 248/289.11 |

FOREIGN PATENT DOCUMENTS

GB    2245093 A    * 12/1991

* cited by examiner

*Primary Examiner*—Gary C Hoge
(74) *Attorney, Agent, or Firm*—Bacon & Thomas, PLLC

(57) ABSTRACT

A simple structure of display device having the function of self-balance and prevent falling caused by an external force is disclosed to include a display, a base, which has a convex bottom surface and is fixedly connected to the bottom side of the display, and an adjustable counterweight structure, which has a weight that can be moved with one hand to change the center of gravity of the display device and to further adjust the viewing angle of the display.

3 Claims, 6 Drawing Sheets

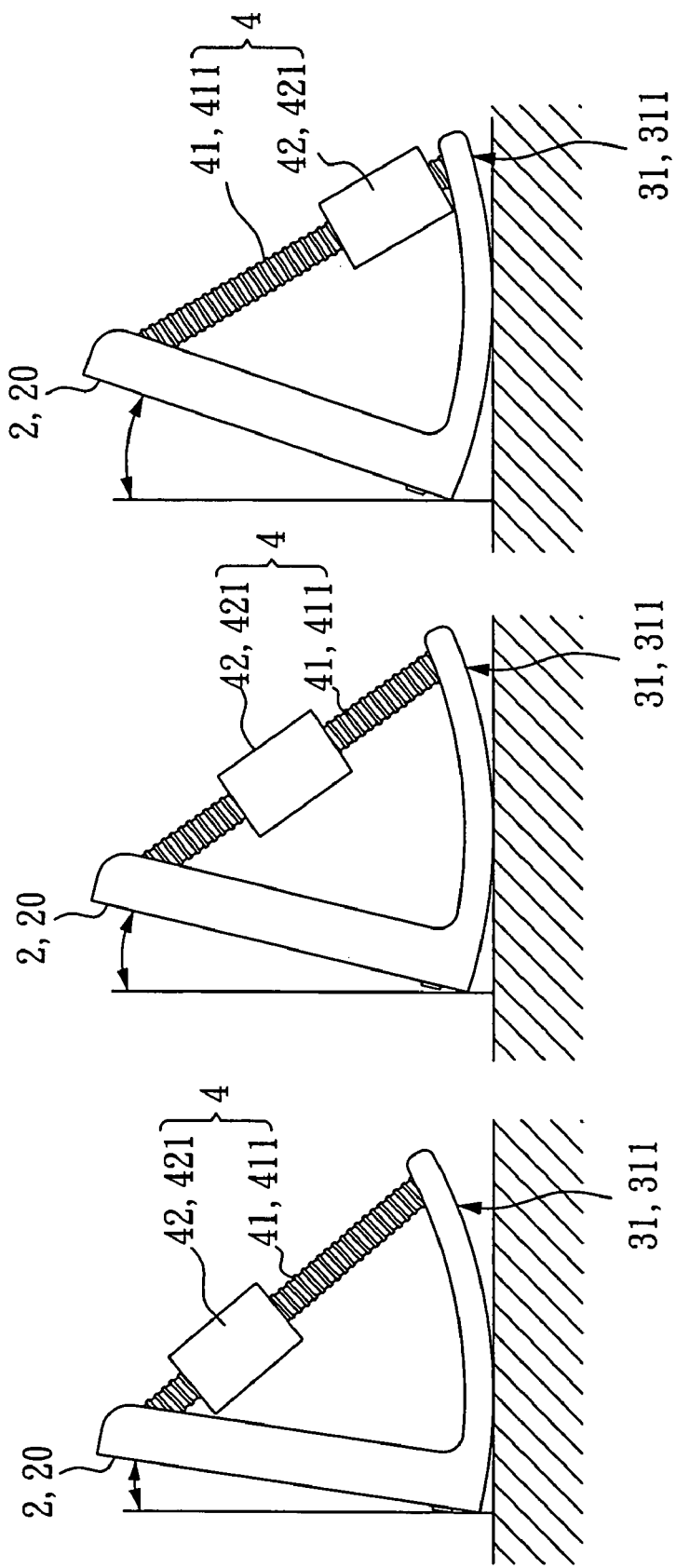

DISPLAY DEVICE HAVING AN ADJUSTABLE COUNTERWEIGHT STRUCTURE

CROSS-REFERENCE TO RELATED APPLICATION

This Application is a divisional of U.S. patent application Ser. No. 11/319,544, filed Dec. 29, 2005.

BACKGROUND OF THE INVENTION

1. Field of the Invention

The present invention relates to display devices and more particularly, to a flat-panel display having an adjustable counterweight structure.

2. Description of Related Art

A conventional CRT monitor is large and heavy, and tends to produce radiation that is harmful to the human body. Due to the aforesaid drawbacks, flat-panel displays such as LCD (Liquid Crystal Display) have been intensively used to replace conventional CRT monitors. Following rapid development of LCD technology and cost reduction through mass production, flat-panel displays have become extremely popular and have become the dominant display device on the market.

An LCD has a liquid crystal cell positioned between two polarizers. An electric field is applied to the liquid crystal cell to make light pass through cell. The liquid crystal filled in the cell, therefore, is like a shutter, either allowing light to pass through or blocking the light. Therefore, the LCD has a certain range of visible angle and a preferable visual angle. An LCD must allow the user to conveniently adjust the viewing angle of the display subject to one's need or environmental conditions. This angle adjustment feature is important in product design of displays.

The angle adjustment structure of an LCD may be formed of a pivot joint or hinge mechanism. The pivot joint or hinge mechanism allows the user to adjust the viewing angle of the screen.

However, conventional pivot joints and hinge mechanisms for LCDs commonly have a complex structure that is expensive and not easy to be manufactured. Most LCDs have slim body designs therefore tend to fall upon oscillation or vibration. Further, when adjusting the viewing angle, the user must hold the base with one hand and tilt the screen with the other hand thus this adjustment procedure is inconvenient. Further, LCDs using these conventional pivot joints or hinge mechanisms commonly have a monotonous outer appearance that give no desirable impression to consumers and cannot adequately cause consumers to buy them.

SUMMARY OF THE INVENTION

The present invention provides a display device having an adjustable counterweight structure. According to the first embodiment, the display device comprises a display, a base, and an adjustable counterweight structure. The base is fixedly provided at the bottom side of the display, and has a convex bottom surface. The adjustable counterweight structure comprises a connecting member linking the display and the base, and a weight mounted on and movable along the connecting member. The user can move the weight along the connecting member with single hand to adjust the center of gravity of the display device and to further adjust the viewing angle of the display subject to the curvature of the convex bottom surface of the base. Further, because of the effect of the convex bottom surface of the base, the whole structure of the display device has the function of self-balance that neutralizes oscillation or vibration caused by an external force or effect of the environment, preventing falling of the display or any unnecessary loss due to damage of the display device. Further, the whole assembly of the display device has a simple structure that is convenient and inexpensive to manufacture and easy to manufacture. Further, the avant-garde but simple design provides a totally new outer appearance that attracts consumers' attention, encouraging them to buy the product.

Further, the convex bottom surface of the base can be a circular arcuate surface, an elliptical arcuate surface, a parabolically curved surface, a double curved surface, or even a spherical surface, an ellipsoid, or a paraboloid.

The adjustable counterweight structure further comprises a locking member adapted to locate the weight to the connecting member in the desired position.

Further, the adjustable counterweight structure can be made having a second connecting member linking the display and the base, a second weight mounted on and movable along the second connecting member, and a second locating adapted to lock the second weight to the second connecting member in the desired position.

In a second embodiment of the present invention, the display device comprises a display, a base fixedly provided at the bottom side of the display, and an adjustable counterweight structure. The base has a convex bottom surface. The adjustable counterweight structure comprises a guide member and a weight. The guide member is provided at the base. The weight is mounted on and movable along the guide member forwards/backwards relative to the display. Alternatively, the guide member can be arranged to guide the weight to move in a transverse direction in parallel to the display.

The aforesaid second embodiment allows the user to adjust the position of the weight with single hand so as to further change the center of gravity of the display device and the viewing angle of the display, i.e., the second embodiment achieves the same effects as the aforesaid first embodiment.

Further, the convex bottom surface of the base according to the second embodiment of the present invention can be a circular arcuate surface, an elliptical arcuate surface, a parabolically curved surface, a double curved surface, or even a spherical surface, an ellipsoid, or a paraboloid.

The adjustable counterweight structure of the display device according to the second embodiment of the present invention further comprises a locking member adapted to secure the weight to the connecting member in the desired position.

According to the third embodiment of the present invention, the display device comprises a display, a base, and an adjustable counterweight structure. The base is fixedly provided at the bottom side of the display, having a convex bottom surface. Further, the adjustable counterweight structure comprises a guide member and a weight. The guide member is provided at the display. The weight is mounted on and movable along the guide member up/down relative to the base. Alternatively, the guide member can be arranged on the display to guide the weight to move in a transverse direction in parallel to the base.

The aforesaid third embodiment allows the user to adjust the position of the weight with single hand so as to further change the center of gravity of the display device, thereby adjusting the viewing angle of the display.

Further, the convex bottom surface of the base according to the third embodiment of the present invention can be a circular arcuate surface, an elliptical arcuate surface, a parabolically curved surface, a double curved surface, or even a spherical surface, an ellipsoid, or a paraboloid.

The adjustable counterweight structure of the display device according to the third embodiment of the present invention further comprises a locking member adapted to secure the weight to the guide member in the desired position.

BRIEF DESCRIPTION OF THE DRAWINGS

FIG. 2 is a schematic drawing showing an adjustment example of the display device according to the first embodiment of the present invention.

FIG. 3 is a schematic drawing showing another adjustment example of the display device according to the first embodiment of the present invention.

FIG. 4 is a schematic drawing showing still another adjustment example of the display device according to the first embodiment of the present invention.

DETAILED DESCRIPTION OF THE PREFERRED EMBODIMENT

Figure 1:
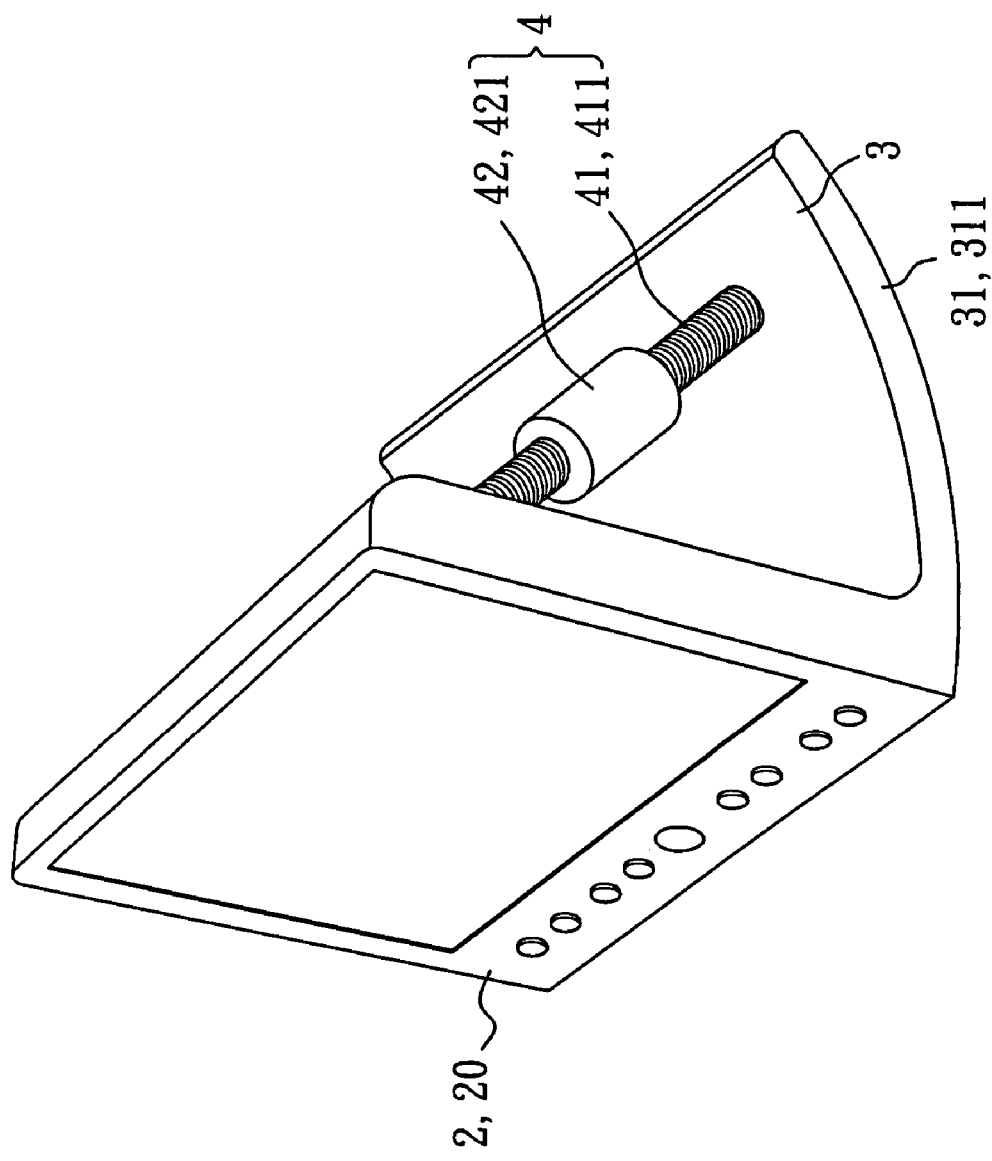
FIG. 1 is an elevational view of a display device constructed according to a first embodiment of the present invention.

Referring to FIGS. 1~4, a display device in accordance with the first embodiment of the present invention is shown comprised of a display 2, a base 3, and an adjustable counterweight structure 4. The display 2 is fixedly connected to one end of the base 3. The base 3 has a convex bottom surface 31. Further, the adjustable counterweight structure 4 comprises a connecting member 41 and a weight 42. The connecting member 41 is connected between the display 2 and the base 3. The weight 42 is movable along the connecting member 41.

As shown in FIG. 1, the display 2 is a flat-panel display 20. The convex bottom surface 31 of the base 3 is a circular arcuate surface 311. Alternatively, the convex bottom surface 31 can be an elliptical arcuate surface, a parabolically curved surface, a double curved surface, or even a spherical surface, an ellipsoid or a paraboloid, subject to the desired design. According to this embodiment, the connecting member 41 is a screw rod 411, and the weight 42 is a nut 421 threaded onto the screw rod 411 and rotatable to move along the screw rod 411 between the flat-panel display 20 and the base 3.

The user can rotate the nut 421 relative to the screw rod 41 with single hand to adjust the center of gravity of the display device and to further adjust the viewing angle of the display 2 subject to the curvature of the circular arcuate surface 311 of the base 3 (see FIGS. 2, 3 and 4). Further, because of the effect of the circular arcuate surface 311 of the base 3, the whole structure of the display device has the function of self-balance that neutralizes oscillation or vibration caused by an external force or effect of the environment, thereby preventing falling of the display 2 or any unnecessary loss due to damage of the display device.

Further, as stated above, the whole assembly of the display device has a simple structure that is convenient and inexpensive to manufacture and easy to manufacture. Further, the avant-garde but simple design provides a totally new outer appearance that attracts consumers' attention, thus encouraging consumers to buy the product.

Figure 5:
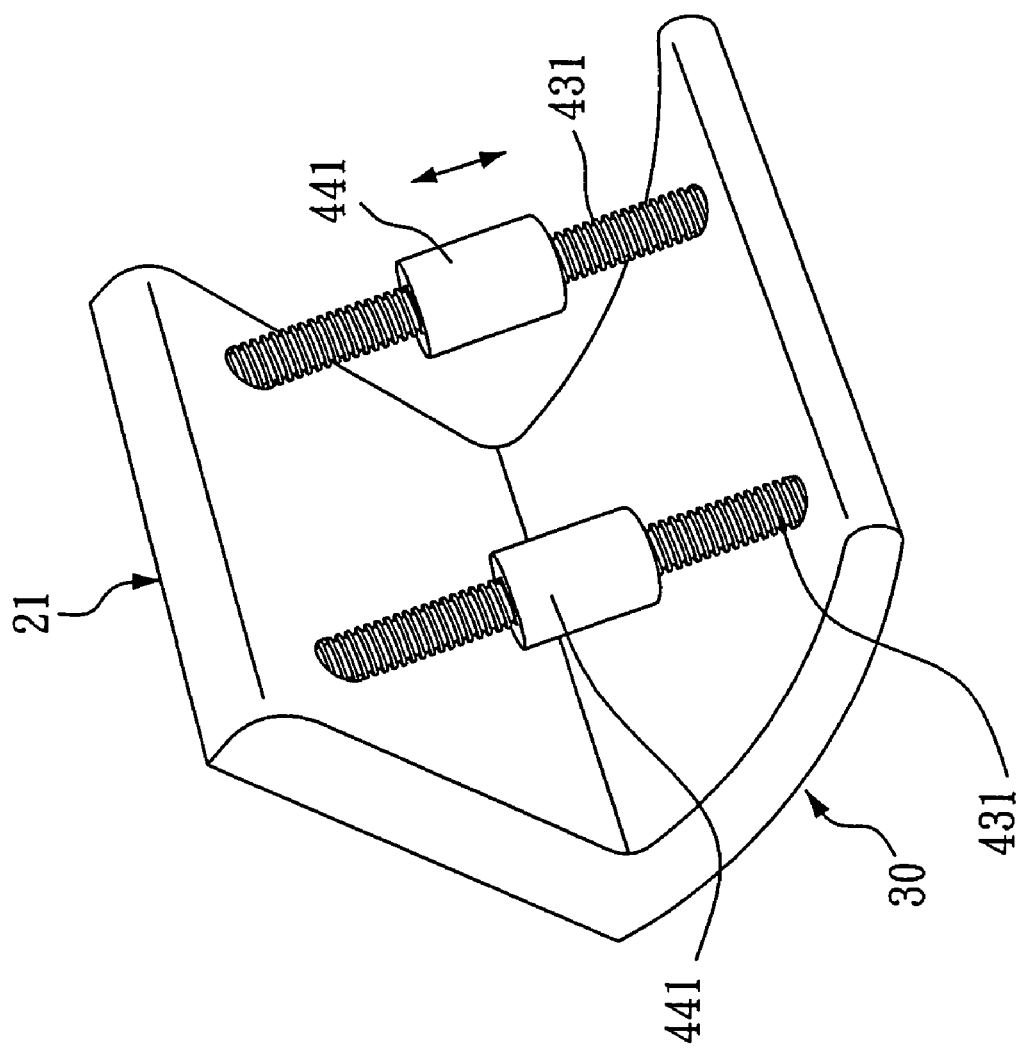
FIG. 5 is an elevational view of a display device constructed according to a second embodiment of the present invention.

FIG. 5 shows a display device constructed according to the second embodiment of the present invention. This embodiment is substantially similar to the aforesaid first embodiment of the present invention with the exception of the adjustable counterweight structure. According to this design, the adjustable counterweight structure comprises two screw rods 431 connected in parallel between the display 21 and a base 30, and two nuts 441 respectively threaded onto the screw rods 431. This embodiment achieves the same effects as the aforesaid first embodiment.

Figure 6:
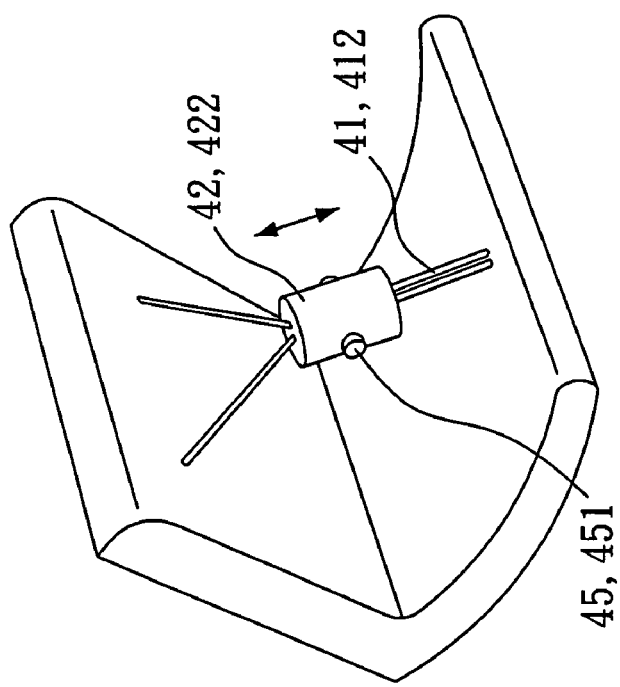
FIG. 6 is an elevational view of a display device constructed according to a third embodiment of the present invention.

FIG. 6 shows a display device constructed according to the third embodiment of the present invention. According to this embodiment, the adjustable counterweight structure comprises a connecting member 41, a weight 42, and a locking member 45. The connecting member 41 is comprised of two cords 412. The weight 42 is a cylindrical block 422 sleeved onto the two cords 412 and movable along the two cords 412. The locking member 45 is a spring retainer 451 mounted in the cylindrical block 422 to locate the cylindrical block 422 to the cords 412 at the desired location. The spring retainer 451 is a known device that automatically secures the cylindrical block 422 to the cords 412 when the spring retainer 451 not pressed, to release the cylindrical block 422 from the cords 412 press the spring retainer 451. The cords 412 can be metal wires, or made out of tough engineering plastics. Therefore, the user can press the spring retainer 451 to unlock the cylindrical block 422 from the cords 412 and then move the cylindrical block 422 along the cords 412 to the desired location to adjust the viewing angle of the display, i.e., this embodiment achieves the same effects as the aforesaid first embodiment.

Figure 7:
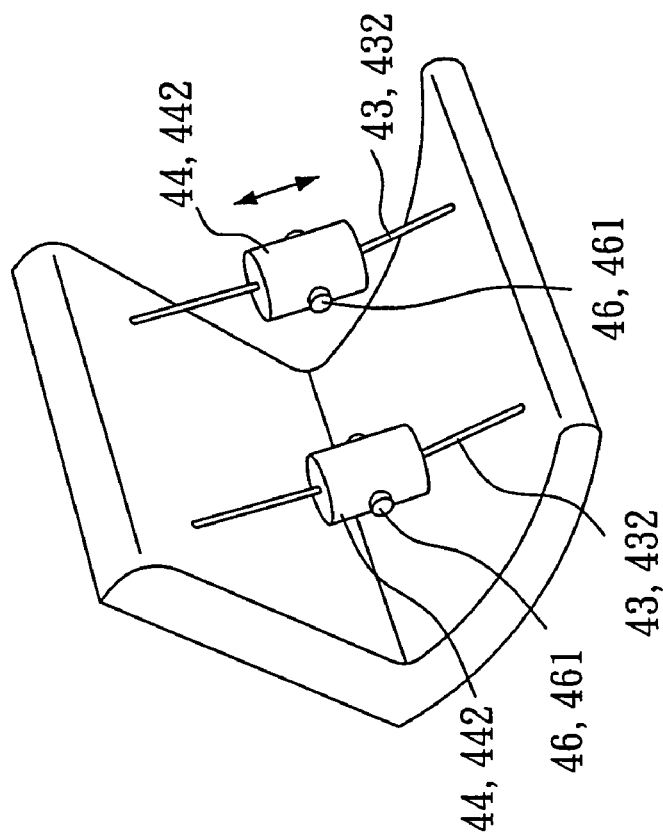
FIG. 7 is an elevational view of a display device constructed according to a fourth embodiment of the present invention.

FIG. 7 shows a display device constructed according to the fourth embodiment of the present invention. According to this embodiment, the adjustable counterweight structure comprises two connecting members 43, two weights 44, and two locking members 46. The connecting members 43 each are comprised of a cord 432. The two cords 432 are respectively inserted through the weights 44 and connected in parallel between the display and the base. The weights 44 are cylindrical blocks 442 respectively mounted on and movable along the cords 432. The locking members 46 are spring retainers 461 respectively fastened to the cylindrical blocks 442 and adapted to locate the cylindrical blocks 442 to the cords 432. According to this embodiment, the cylindrical blocks 442 can be separately adjusted on the respective cords 432. Similar to the aforesaid third embodiment, the cords 432 can be metal wires, or made out of tough engineering plastics.

Figure 8:
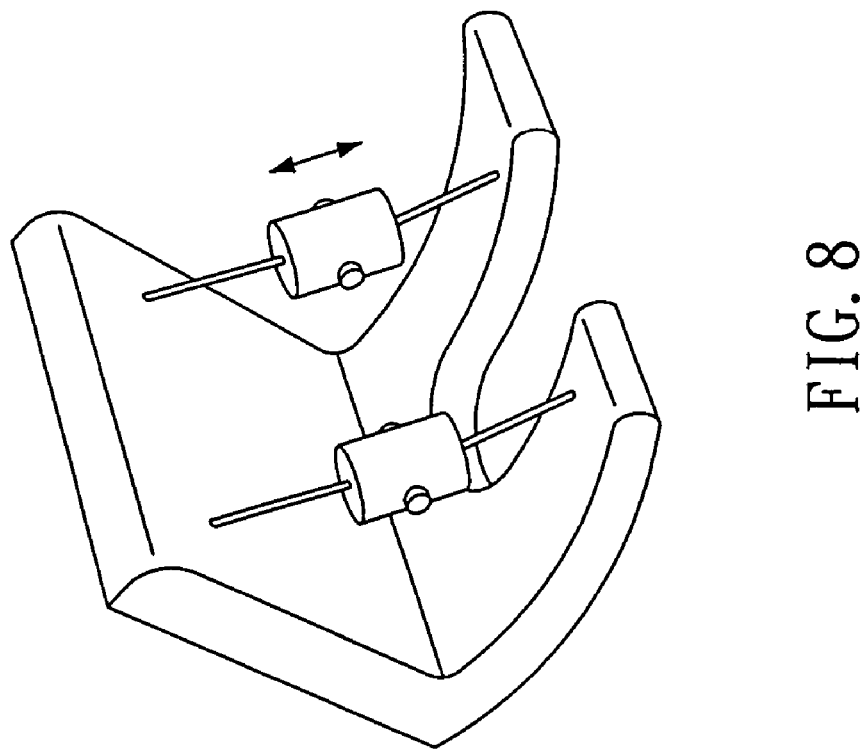
FIG. 8 is an elevational view of a display device constructed according to a fifth embodiment of the present invention.

FIG. 8 shows a display device constructed according to the fifth embodiment of the present invention. This embodiment is substantially similar to the aforesaid fourth embodiment with the exception of the shape design of the base. This design achieves the same effects as the aforesaid various embodiments while making the whole assembly relatively lighter.

Figure 9:
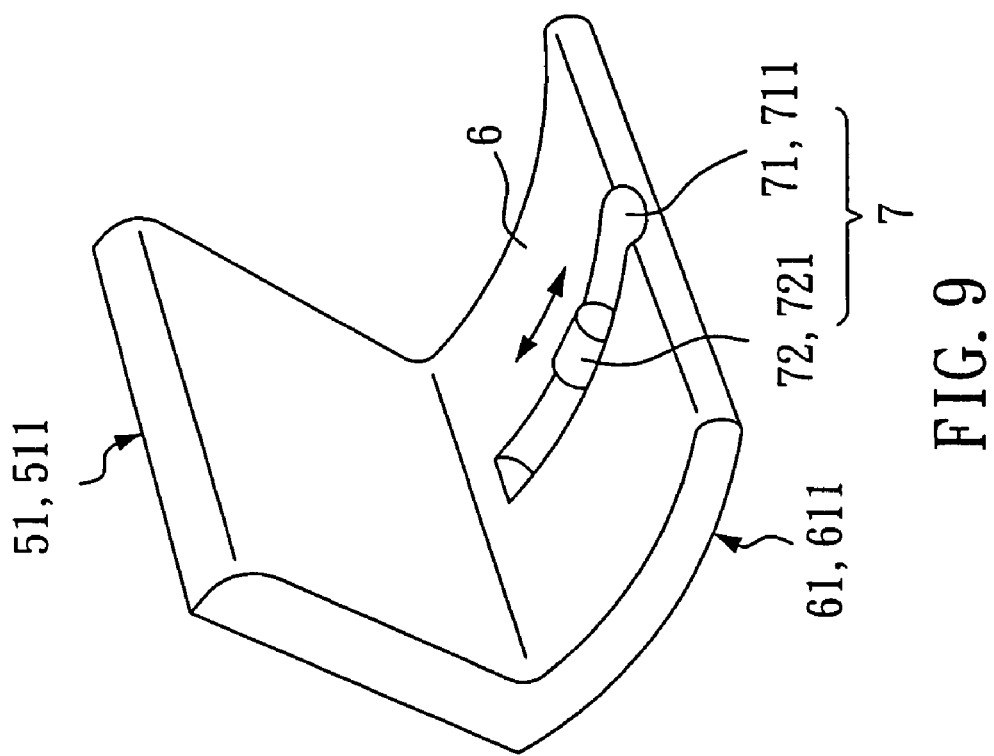
FIG. 9 is an elevational view of a display device constructed according to a sixth embodiment of the present invention.

FIG. 9 shows a display device constructed according to the sixth embodiment of the present invention. According to this embodiment, the display device comprises a display 51, a base 6, and an adjustable counterweight structure 7. The display 51 is fixedly connected to one end of the base 6. The base 6 has a convex bottom surface 61. The adjustable counterweight structure 7 comprises a guide 71 and a weight 72. The guide 71 is provided at the base 6. The weight 72 can be moved along the guide 71 toward or away from the display 51 and then firmly positioned on the guide 71 at the desired location by means of a tightening up force or friction force.

As illustrated in FIG. 9, the display 51 according to this embodiment is a flat-panel display 511, and the convex bottom surface 61 of the base 6 is a circular arcuate surface 611. Alternatively, the convex bottom surface 61 can be an elliptical arcuate surface, a parabolically curved surface, a double curved surface, or even a spherical surface, an ellipsoid or a paraboloid, subject to the desired design. Further, the guide 71 according to this embodiment is a groove 711, and the weight 72 is a sliding block 721 movable by a user's force along the groove 711.

Therefore, the user can move the sliding block 721 along the groove 711 to adjust the center of gravity of the display device and to further adjust the viewing angle of the display 51 subject to the curvature of the circular arcuate surface 611 of the base 6. Further, this embodiment achieves the same effects of the aforesaid first embodiment.

Figure 10:
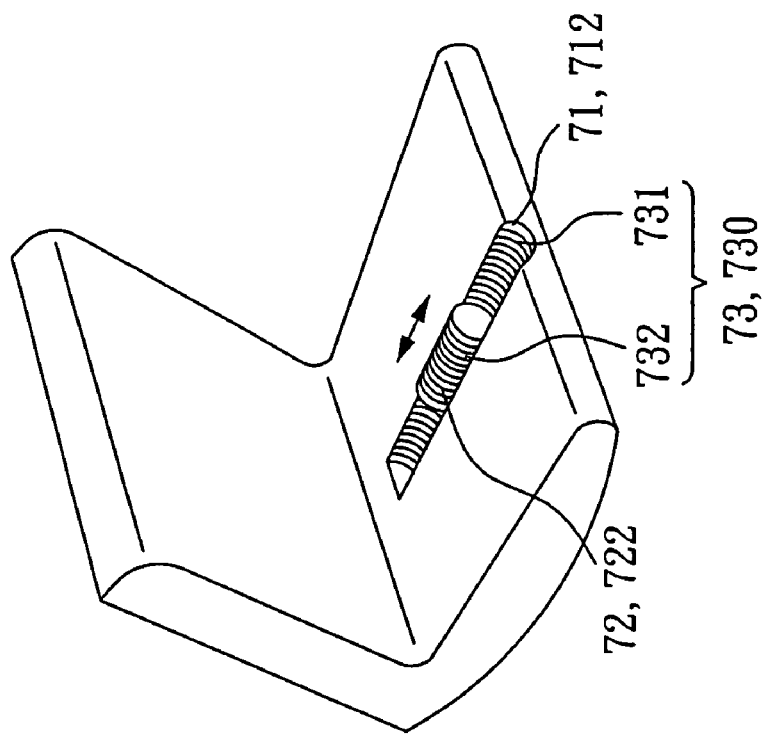
FIG. 10 is an elevational view of a display device constructed according to a seventh embodiment of the present invention.

FIG. 10 shows a display device constructed according to the seventh embodiment of the present invention. This embodiment is substantially similar to the aforesaid sixth embodiment with the exception of an additional positioning structure 73. According to this embodiment, the guide 71 is a guide groove 712 having female threads 731; the weight 72 is a cylindrical block 722 having male threads 732 matingly threaded onto the female threads 731; the positioning structure 73 is screw joint 730 formed of the female threads 731 and the male threads 732.

The user can rotate the cylindrical block 722 to adjust the position of the cylindrical block 722 in the guide groove 712. Therefore, this embodiment achieves the same effects as the aforesaid sixth embodiment.

Figure 11:
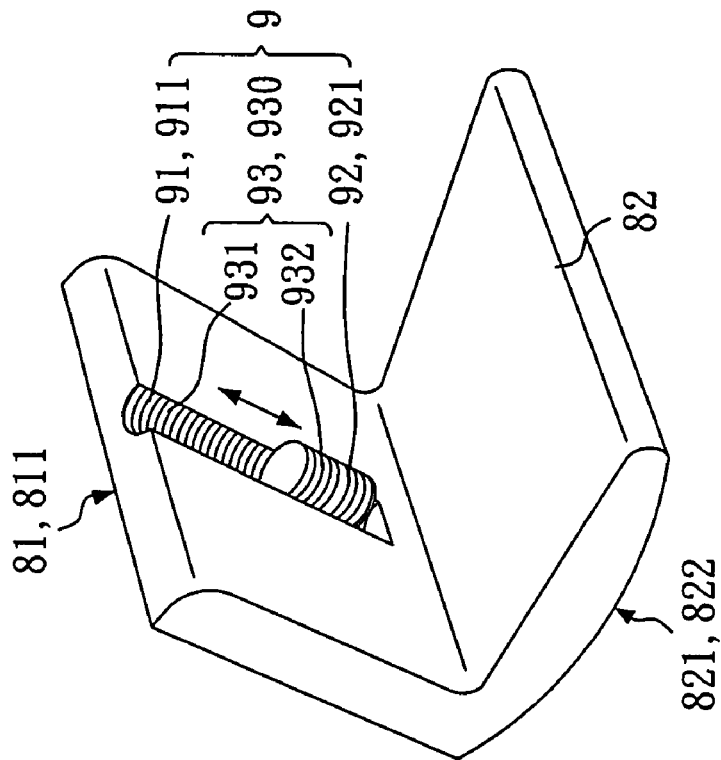
FIG. 11 is an elevational view of a display device constructed according an eighth embodiment of the present invention.

FIG. 11 shows a display device constructed according to the eighth embodiment of the present invention. According to this embodiment, the display device comprises a display 81, a base 82, an adjustable counterweight structure 9, and a positioning structure 93. The display 81 is fixedly connected to one end of the base 82. The base 82 has a convex bottom surface 821. Further, the adjustable counterweight structure 9 comprises a guide 91 and a weight 92. The guide 91 is provided at the backside of the display 81 and has a C-shaped cross section. The weight 92 is movable along the guide 91 up or down relative to the base 82. Further, the positioning structure 93 is adapted to locate the weight 92 on the guide 91 at a particular location.

As shown in FIG. 11, the display 81 is a flat panel display 811. The convex bottom surface 821 of the base 82 is a circular arcuate surface 822. Alternatively, the convex bottom surface 821 can be an elliptical arcuate surface, a parabolically curved surface, a double curved surface, or even a spherical surface, an ellipsoid or a paraboloid, subject to the desired design. Further, the guide 91 is a guide groove 911 having female threads 931; the weight 92 is a cylindrical block 921 having male threads 932 matingly threaded onto the female threads 931; the positioning structure 93 is a screw joint 930 formed of the female threads 931 and the male threads 932.

The user can rotate the cylindrical block 921 to adjust the position of the cylindrical block 921 in the guide groove 911 to further adjust the viewing angle of the flat-panel display 811. Therefore, this embodiment achieves the same effects as the aforesaid first embodiment.

Although the present invention has been explained in relation to its preferred embodiments, it is to be understood that many other possible modifications and variations can be made without departing from the spirit and scope of the invention as hereinafter claimed.

What is claimed is:

1. A display device having an adjustable counterweight structure comprising:
    a display;
    a base fixedly connected to a bottom side of said display, said base having a convex bottom surface; and
    an adjustable counterweight structure, said adjustable counterweight structure comprising a connecting member connected between said display and said base and a weight mounted on and movable along said connecting member; wherein
    said adjustable counterweight structure further comprises a locking member adapted to locate said weight on a specific location of said connecting member.

2. The display device as claimed in claim 1, wherein said connecting member of said adjustable counterweight structure is comprised of at least one cord member; said weight is a block coupled to and movable along said at least one cord member; said locking member is a spring retainer fastened to said block and adapted to locate said block to said at least one cord member.

3. The display device as claimed in claim 2, wherein the quantity of said at least one cord member of said adjustable counterweight structure is two.

* * * * *